2,881,228
Patented Apr. 7, 1959

2,881,228

PRODUCTION OF TRIMETHYLBENZENES BY XYLENE DISPROPORTIONATION

David A. McCaulay, Chicago, Ill., assignor to Standard Oil Company, Chicago, Ill., a corporation of Indiana No Drawing. Application July 29, 1955
Serial No. 525,357

2 Claims. (Cl. 260—671)

This invention relates to the preparation of trialkylbenzenes, particularly trimethylbenzenes. More specifically the invention relates to the disproportionation of xylene to trimethylbenzene.

A great interest has arisen in the trimethylbenzenes, also trialkylbenzenes wherein the alkyl group is either methyl or ethyl and mixtures thereof. These trialkylbenzenes are of importance as the feed to aromatic carboxylic acid production and other chemical intermediates. Another use for the trimethylbenzenes is as a raw material for the preparation of tetramethylbenzenes, particularly for the ultimate production of durene.

It is well known that xylenes can be disproportionated to a mixture of trimethylbenzenes with various catalysts, particularly liquid HF and liquid HF-BF$_3$. The liquid HF-BF$_3$ catalyst tends to produce a mesitylene-rich product, whereas pseudocumene is presently the preferred trimethylbenzene isomer. Liquid HF catalyst disproportionation of xylenes requires high catalyst usage, high temperatures, and rather long times in order to obtain good conversions of xylene per pass.

An object of the invention is a xylene disproportionation process. Another object of the invention is a xylene disproportionation process producing psuedocumene as the predominant trimethylbenzene product. Yet another object is a xylene disproportionation process which requires less catalyst and lower temperatures than the previous liquid HF catalyzed processes. Other objects will become apparent in the course of the detailed description.

In the process of this invention, xylene, a single isomer or a mixture of isomers, is disproportionated using liquid HF catalyst in the presence of a disproportionation reaction rate promoter hereinafter described as an ethylbenzene derivative. The ethylbenzene derivative has the general formula—

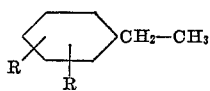

where R may be either hydrogen, a methyl radical or an ethyl radical. In general, the mole ratio of xylene to ethylbenzene derivative in the contacting zone is from about 20:1 to about 2:1. Generally between about 25 and 400 volume percent of liquid HF catalyst, based on hydrocarbon feed to the contacting zone, is used and the contacting is carried out generally at a temperature between about 130° C. and 190° C. Preferably the catalyst usage is between about 50 and 100 volume percent. A greater yield of trimethylbenzene is produced in the presence of the ethylbenzene derivative than is obtained under the same operating conditions except for the absence of ethylbenzene derivative.

The xylene feed to the process may be any xylene isomer, i.e., ortho-xylene, meta-xylene or para-xylene. Or it may contain two or more xylene isomers. It is preferred to utilize a feed which is substantially free of non-aromatic hydrocarbons, although amounts up to about 5 volume percent of these hydrocarbons may be present. The presence of non-aromatic hydrocarbons at the higher operating temperatures results in side reactions such as cracking with subsequent formation of high boiling tars and higher molecular weight alkylxylenes. It is preferred to use an essentially pure aromatic xylene feed such as is obtainable by glycolic solvent extraction of catalytic reformates.

The disproportionation reaction rate promoter utilized in the process is ethylbenzene derivative having the general formula—

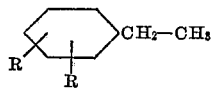

wherein R represents either hydrogen or a methyl radical or an ethyl radical. Thus the ethylbenzene derivatives may be ethylbenzene, diethylbenzene, triethylbenzene, ethyltoluene, diethyltoluene and ethylxylene. In the case of the derivatives containing two or more alkyl groups the individual isomers or any mixture of isomers may be used. Also, two or more different ethylbenzene derivatives may be utilized. The preferred ethylbenzene derivative promoters are ethylbenzene and ethylxylene.

The presence of even small amounts of defined ethylbenzene derivative in the contacting zone has a beneficial effect on the rate of xylene disproportionation. In general, the mole ratio of xylene to defined ethylbenzene derivative is between about 20:1 and about 2:1 and preferably between about 5:1 and 2:1. Hereinafter the mixture of defined xylene and defined ethylbenzene derivative charged to the contacting zone is spoken of as the hydrocarbon feed to the process. A particularly suitable hydrocarbon feed is the natural mixture of xylenes and ethylbenzenes obtained by solvent extraction of catalytic reformates. Another particularly good feed is this mixture of xylene and ethylbenzene which has been fractionally distilled to remove most of the orthoxylene.

The catalyst utilized in the process is an anhydrous liquid hydrogen fluoride or substantially anhydrous liquid hydrogen fluoride. Commercial grade anhydrous hydrofluoric acid is a particularly suitable catalyst. In order to maintain a high level of catalyst activity, the liquid HF catalyst should contain not more than about 2 or 3 weight percent of water.

In order to maintain the water content of the system at this low level, the feed hydrocarbons must be of low water content in order to avoid introducing excessive amounts of water into the system. Thus the entire process is carried out under substantially anhydrous conditions.

Although lower temperatures may be used when the time of contacts is not of particular importance, and higher temperatures may be used when side reactions such as cracking of the ethyl groups may be controlled by operating at very short contacting times, usually the process is carried out at a temperature between about 130° C. and 190° C. Preferably the process is carried out at a temperature between about 160° C. and 175° C.

The presence of the defined ethylbenzene derivative very markedly increases the rate of xylene disproportionation. Thus the contacting times utilized in this process are very much shorter than those utilized in processes operating on xylene feed alone. However, even with ethylbenzene derivatives present, the contacting time needed to approach the equilibrium condition of trimethylbenzene product is dependent on the temperature of contacting i.e., the higher the temperature, the shorter the corresponding time. Also, the greater the amount of catalyst utilized at a given temperature, the shorter the contacting time. In general, when operating between about 130° C. and 190° C., the time of contacting needed to obtain 25% or more disproportionation of the xylene is between about 10 minutes and 3 hours, the longer times corresponding to the lower temperatures. When operating in the preferred temperature range of 160° C. to 175° C., and with the preferred catalyst usage of between about 50 and 100 volume percent, the time for obtaining 25% or more disproportionation of the xylene is between about 30 and 90 minutes, the longer times corresponding to the lower temperatures.

The process produces a mixture of trimethylbenzene and also some ethylxylene. (When ethylbenzene is charged, some diethylbenzene is also produced; when ethyltoluene is charged, some diethyltoluene is also produced.) When operating to obtain 25% disproportionation of the xylene or more, the trimethylbenzene product is at about the thermodynamic equilibrium composition, namely hemimellitene, 5%, psuedocumene, 60%, and mesitylene, 35%. Some isomerization of the xylenes occurs in addition to the disproportionation. When a single isomer or mixture of two isomers is charged, the xylene portion of the hydrocarbon product mixture approaches the thermodynamic equilibrium content of the three xylene isomers. Surprisingly, when a mixture of xylene and ethylbenzene is utilized as the feed, the rate of xylene disproportionation and ethylbenzene conversion appears to be about the same so that the composition of the $C_8$ aromatic fraction in the hydrocarbon product mixture is about the same as the composition of the $C_8$ aromatic hydrocarbon fraction in the feed. Thus it is entirely feasible to recycle the $C_8$ aromatic hydrocarbon fraction to the feed contacting zone without any effect on the product distribution.

It is to be understood that the process involves a liquid phase reaction system and sufficient pressure is maintained on the system to keep both the feed hydrocarbons and the HF catalyst in the liquid state.

At the temperatures of operation, the trimethylbenzenes are soluble to the extent of 15–20 volume percent in the liquid HF and the xylenes are somewhat less soluble. A two-phase system (ignoring HF and hydrocarbon vapors) exists in the contacting zone. At the end of the desired contacting time, the two-phase system is withdrawn and may be readily separated or decanted into an upper hydrocarbon product mixture phase containing some dissolved catalyst and a lower HF phase containing dissolved hydrocarbons.

When the production of tetramethylbenzenes is of interest the separated hydrocarbon-containing catalyst phase may be recycled directly to the contacting zone. When operating in this way, tetramethylbenzenes and ethyltrimethylbenzenes will be produced in addition to the trimethylbenzenes. In view of the very low boiling point of HF as compared to the aromatic hydrocarbons present in the acid phase, it is a simple matter to distill away the HF and obtain a liquid HF material which is entirely suitable for recycle to the contacting zone.

EXAMPLE

The results obtainable by the process of the invention are set out in several illustrative runs. The runs were carried out in a one-liter Hastelloy autoclave provided with a motor-driven stirrer. In the experimental procedure, the feed hydrocarbon was charged to the autoclave and the whole heated to about 30° C. above the desired reaction temperature. The liquid HF catalyst (commercial anhydrous hydrofluoric acid containing 99.5% HF) was then charged to the autoclave; the desired reaction temperature was thereby reached within a few seconds. The mixture was stirred for the desired time and at the end of this time the entire mixture was withdrawn into a polyethylene flask immersed in a Dry-Ice acetone bath. About one volume of cold water per volume of liquid HF charged was added to the flask. The upper layer of hydrocarbons was separated from the lower aqueous layer. The hydrocarbon layer was neutralized and fractionated through a distillation column providing about 30 theoretical plates. The close-boiling fractions were analyzed by infrared absorption techniques for individual isomer content. The hydrocarbons used in the runs were Eastman white label grade.

The results of these illustrative runs A through E are set out in the table.

Run No. A was carried out using a feed consisting of substantially the equilibrium distribution of the three xylene isomers. The run was carried out at 165° C. for a time of 60 minutes. The hydrocarbon product showed that 18% of the xylenes had been disproportionated to form trimethylbenzene and toluene and also a trace amount of tetramethylbenzene. Infrared analysis of the trimethylbenzene product showed it to be at about the equilibrium for trimethylbenzenes. Run No. B was carried out at close to the same conditions as Run No. A except that the feed consisted of xylenes and ethylbenzene in a mole ratio of 3:1. In Run No. B, 52% of the xylenes in the feed were converted; 45% of the xylenes in the feed disproportionated to form trimethylbenzene. The remainder interacted with ethylbenzene to form ethylxylenes. In addition to the formation of ethylxylene, some ethylbenzene disproportionated to diethylbenzene. Infrared analysis of the $C_8$ aromatic product fraction showed it to have the same molar distribution of xylenes and ethylbenzene as were present in the feed. Thus the presence of ethylbenzene along with the xylenes in the contacting zone resulted in tripling the amount of xylenes converted.

Run No. C was carried out to show the importance of contacting time at a given temperature. This run was carried out at the conditions of Run No. A except for the time. The product hydrocarbon distribution of Run No. C shows that even at this high temperature 3 minutes time is not sufficient to give more than detectable amounts of disproportionation products. Run No. D shows that 44 hours contacting time at a moderate atmospheric temperature is not sufficient to produce more than detectable amounts of disproportionation products even when operating with a feed consisting of xylene and ethylbenzene. Run No. E shows that at 24 hours contacting time at about room temperature ethylbenzene disproportionates to a very slight extent.

Table

| Run No. | A | B | C | D | E |
| --- | --- | --- | --- | --- | --- |
| Feed composition, mole percent: | | | | | |
| Xylenes [1] | 100 | 75 | 100 | 75 | 0 |
| Ethylbenzene | 0 | 25 | 0 | 25 | 100 |
| HF, vol. percent on feed | 100 | 100 | 100 | 100 | 100 |
| Temperature, °C | 165 | 170 | 169 | 28 | 25 |
| Time, minutes | 60 | 60 | 3 | 2,670 | 1,440 |
| Product recovery, weight percent | 97 | 96 | | 97 | 98 |
| Product distribution, mole percent: | | | | | |
| Benzene | 0 | 10 | 0 | 1 | 1 |
| Toluene | 9 | 15 | 1 | 0 | 0 |
| $C_8$'s | 82 | [2] 48 | 98 | 98 | 98 |
| Trimethylbenzene | 9 | 17 | 1 | 0 | 0 |
| $C_{10}$'s | 0 | [3] 10 | 0 | 1 | 1 |
| Tetramethylbenzene | Tr. | 0 | 0 | 0 | 0 |
| Trimethylbenzene distribution, mole percent: | | | | | |
| Pseudocumene | 60 | | | | |
| Mesitylene | 35 | | | | |
| Hemimellitene | 5 | | | | |

[1] Ortho-, 20%; meta-, 60%; para-, 20%.
[2] Xylenes, 75%; ethylbenzene, 25%.
[3] Ethylxylenes, 70%; diethylbenzene, 30%.

The above data show clearly that by operating with an ethylbenzene derivative in the xylene contacting zone the rate of disproportionation of xylene was increased to a remarkable extent and that by the use of the ethylbenzene derivative it is possible to markedly decrease the severity of operating conditions needed to produce high conversions of xylene utilizing liquid HF catalyst.

Thus having described the invention, what is claimed is:
1. A process for preparing trimethylbenzene from xylene which comprises contacting, under substantially anhydrous conditions, at least one xylene with ethylbenzene in a molar ratio of xylene to ethylbenzene of between about 5:1 and 2:1, with liquid HF as the only catalyst present, in an amount between about 50 and 100 volume percent based on hydrocarbon feed, at a temperature between about 160° C. and 175° C. for a time between about 30 and 90 minutes, the longer times corresponding to the lower temperatures, removing HF from a hydrocarbon product mixture comprising xylene, ethylbenzene, trimethylbenzene, and $C_{10}$ aromatic hydrocarbons and separating trimethylbenzenes from said product mixture.

2. The process of claim 1 wherein the xylene, ethylbenzene and $C_{10}$ aromatic hydrocarbons from said product mixture are recycled to the contacting step.

References Cited in the file of this patent

UNITED STATES PATENTS

| | | |
|---|---|---|
| 2,416,184 | Lee et al. | Feb. 18, 1947 |
| 2,564,073 | Lien et al. | Aug. 14, 1951 |